May 15, 1956
S. R. BURDICK
2,745,702
SAFETY VALVE FOR FLUID CONTROL SYSTEM
Filed April 8, 1950
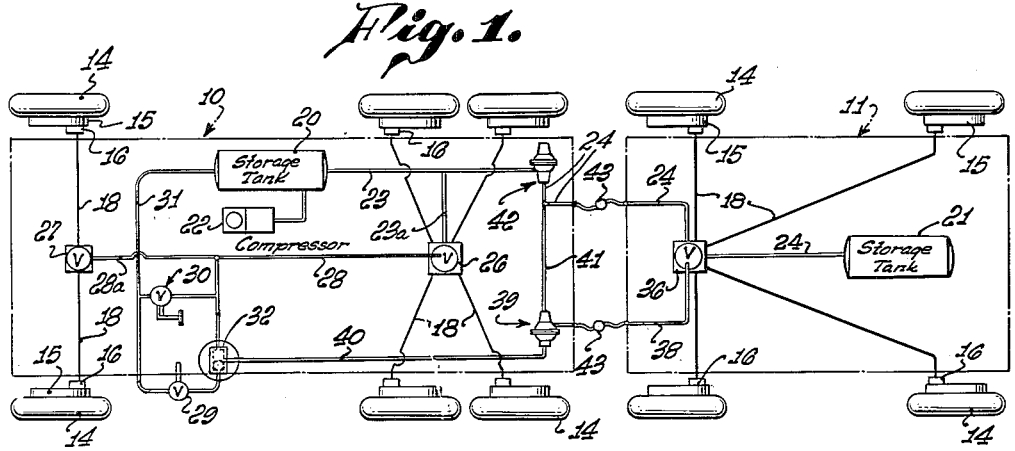
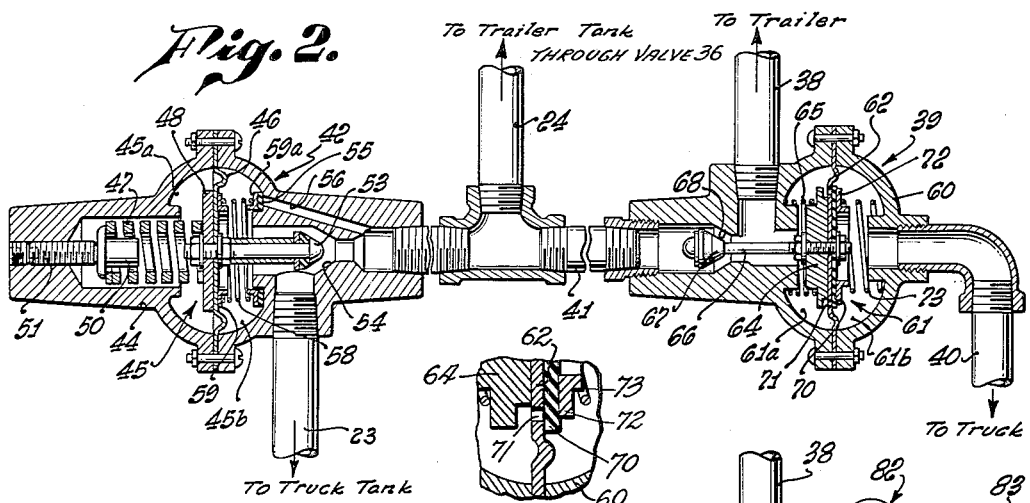
INVENTOR.
SHERMAN R. BURDICK,
BY
Knight & Rodgers
ATTORNEY.

United States Patent Office 2,745,702
Patented May 15, 1956

2,745,702

SAFETY VALVE FOR FLUID CONTROL SYSTEM

Sherman R. Burdick, Gardena, Calif., assignor to Burdick Bros., Inc., Gardena, Calif., a corporation of California Application April 8, 1950, Serial No. 154,865

7 Claims. (Cl. 303—84)

The present invention relates generally to fluid systems for controlling or operating fluid actuated devices, and more especially to a system including means for preventing loss of operating fluid or operating pressure as a result of a mechanical failure in the system. Such means may take the form of a valve structure adapted to cut off from the remainder of the system a portion of the system which is incapable of operating the fluid actuated devices because of a loss of fluid or operating pressure from that portion. The remainder of the system is thus able to operate in a normal manner.

A typical example of the fluid systems with which we are here concerned are air brake systems on motor vehicles. On many trucks, especially the larger ones, the brakes are operated by compressed air since it is impractical to get enough operating force for all the brakes through a mechanical linkage operated by the driver. This is especially true when a truck or a tractor is pulling a trailer or similar unit equipped with brakes on its own wheels.

With motor vehicles of this type, the air brake system commonly includes a main supply line which not only interconnects storage tanks on the truck and on the trailer but also supplies air to the cylinders or similar devices which operate the brakes. A second or control line runs from the master valve operated by the driver to remote control valves which are actuated by air pressure in the control line to control the supply of air under pressure to the brake cylinders. The main supply line and the control line both run from the truck to the trailer and they are each provided with hose sections between the truck and trailer equipped with connectors of a conventional type so that the air brake systems of the two vehicles can quickly be connected by the driver, when the trailer is attached to the truck, in a manner to permit him to control all the brakes of both vehicles from a single master valve.

Braking systems of this type are subject to mechanical failures in any one of a number of different ways that result in a loss of air pressure, either slowly or suddenly. A leak may develop in any one of the numerous couplings in the system, or a hose may deteriorate and leak, and finally rupture suddenly when full pressure is applied to it. A particular point of weakness in air brake systems of the type just described is in the hose sections between the truck and trailer. Sometimes the connections are not made properly and the connectors jar loose under the constant vibration applied to them as the vehicles move over the road. Again, the hoses may become broken for any one of a number of causes, as for example when the towing connection between the two vehicles breaks and the hoses are pulled apart. If either hose breaks, the driver may find himself without any brakes, at least on the truck or tractor. A break in the main supply line allows the air from the reservoir or storage tank on the truck to escape to the atmosphere so that the brake system for the truck is rendered inoperative as a result of loss of operating fluid. A break in the control line makes it impossible to apply air to the remote control valves for the purpose of applying the brakes.

In the usual installation, the trailer is equipped with an emergency type valve that operates automatically to supply air from the auxiliary reservoir tank on the trailer to the brake cylinders on the trailer when the main supply line is broken. With a break in the main supply line and a trailer so equipped, the brakes are automatically set on the trailer; but the truck is without any means of applying its brakes so that the two vehicles may not stop quickly or stop on a steep grade. If the towing connection between the two vehicles should part when the trailer brakes are set, the truck is cut loose without any means of stopping it.

The serious nature of a sudden and complete failure of the air brake system on a motor vehicle is obvious and needs no detailed explanation. Brake failures oftentimes occur while the vehicles are in motion, possibly traveling at a relatively high speed on the highway, and under these circumstances, the vehicle is suddenly rendered incapable of being stopped. If the brakes fail while the vehicle is traveling down a long hill or traveling on a city street, an accident is almost inevitable. A particularly serious feature is that innocent vehicles and persons may suffer considerable damage by being hit. Also a substantial amount of secondary damage may result from fire, as in the case of a collision with a truck carrying a cargo of gasoline or other inflammable liquid.

Control systems with which the present invention is primarily concerned are vehicle brake systems using compressed air as the operating medium. However, it will be understood that my invention is not necessarily limited to the air brake system of a motor vehicle although it is shown and described in that connection because it is particularly adapted to trucks towing trailers or similar units; but the principles of my invention may be applied to other types of control systems which it is desired to protect against loss of operating pressure or fluid as a result of a break in the line.

Hence, it becomes a general object of my invention to provide a pressure fluid control system which is safeguarded against being rendered completely inoperable by loss of operating pressure or fluid as a result of a break in a fluid carrying conduit.

It is also a general object of my invention to provide a compressed air braking system having a main fluid supply system and a control fluid system with means for protecting the braking system against complete loss of fluid so that a portion of the entire system is still fully operative even though fluid loss in another portion of the system may render the other portion inoperative.

It is a further object of my invention to incorporate in an air brake system valve means in the air supply and control conduits which permit the system to operate in the usual manner but which operate to cut off a portion of the system in the event that the air pressure in the main supply line drops below a predetermined value.

It is a further object of my invention to provide valve means which may be incorporated in a conventional air brake system of a truck and trailer at one or more convenient points on the truck to protect the truck against loss of operating fluid or pressure even though a connection to the trailer may be broken.

These and other objects of my invention have been attained in a pressure fluid system constructed according to my invention. Typically, and in a preferred embodiment, this pressure fluid system is the compressed air braking system for a truck or tractor and a trailer being pulled thereby. The presence of two separable vehicles serves to physically divide the braking system into two major sections which are located one on each of the vehicles. Functionally, the fluid pressure system includes a fluid supply system, having two spaced sources of fluid under pressure interconnected by a main supply conduit, and a control fluid system which is connected to the supply system to receive fluid therefrom and is associated with the fluid actuated units in a manner to control their operation. The two sources of fluid under pressure are usually provided in the form of reservoirs or storage tanks, one on the truck and one on the trailer. These two sources are interconnected by a main supply conduit which serves as a means for replenishing the trailer tank from the truck tank when air is consumed in operation of the brakes since a compressor or similar unit is ordinarily provided only on the truck. From the storage tanks or the main supply line, air is supplied to each of the brake cylinders through suitable branch conduits which are connected to a remotely controlled distributing valve preferably of the quick release type which is in turn controlled by air pressure. All of these elements of the system may be of any conventional design commonly found upon commercial vehicles now in use.

In the main supply conduit there is inserted a safety valve which, when closed, has the effect of dividing the supply line into two parts, the truck supply conduit and the trailer supply conduit. The safety valve has a movable valve member that is normally open while the main supply system and conduit has operating pressure in it but is biased towards a closed position which the valve member assumes when pressure within the supply conduit drops below a predetermined point.

On each of the two vehicles is a control fluid conduit which separately receives operating fluid from the main supply system. Air pressure in either control conduit actuates a valve that controls operation of the brakes on the truck or trailer, as the case may be, by regulating admission of air to or exhaust from the brake cylinders of that vehicle. The control fluid conduit on the truck is connected to a master control valve connected to the foot brake pedal and under the control of the driver to regulate admission of fluid under pressure into the control conduit. The truck control conduit is also connected to a second safety valve which regulates the supply of operating fluid to the trailer control conduit from the supply system, the valve at this point being of a character to insure substantially equal pressure in both control conduits and thereby insure simultaneous application of the brakes on both vehicles.

The trailer is also supplied with automatic emergency type valve, of suitable conventional design, which operates to apply the brakes automatically when pressure within the reservoir or supply line on the trailer is reduced below a certain predetermined value. Different makes of emergency valves are actuated in somewhat different ways, but always in response to conditions causing a sudden drop in pressure in the supply lines. This type of valve is provided to apply the trailer brakes before the reservoir supply of fluid is entirely exhausted in the event of some failure in the system on the trailer which causes a loss of operating fluid.

In addition to the valves mentioned above, I prefer to provide a check valve which operates in conjunction with the first mentioned safety valve to connect the truck and trailer sections of the supply conduit. This check valve permits fluid flow out of the trailer supply conduit, when pressure therein is higher, into the truck supply conduit, but closes when the pressure in the latter conduit is higher in order to prevent flow in the opposite direction since flow in the opposite direction is controlled by the spring biased safety valve. Likewise, a second check valve is provided to operate in conjunction with the second mentioned safety valve between the two control conduits. This second check valve operates in a similar way to permit fluid flow from the trailer control conduit into the truck control conduit when pressure in the trailer conduit is higher; but the check valve closes when the pressure in the truck control line is higher in order to prevent reverse fluid flow.

How the above objects and advantages of my invention, as well as others not specifically referred to herein, are attained will be more readily understood by reference to the following description and to the annexed drawings, in which:

Fig. 1 is a schematic plan of a truck and trailer showing a compressed air system for operating the brakes in these vehicles, constructed according to my invention;

Fig. 2 is a horizontal section through a portion of the system showing a preferred form of novel safety valves constructed according to my invention;

Fig. 3 is a view similar to Fig. 2 of a variational form of valve construction; and Fig. 4 is an enlarged fragment of Fig. 2.

Fig. 1 shows diagrammatically a compressed air braking system constructed according to my invention applied to a truck and a trailer towed by the truck. The word "truck" as used herein is used in a broad sense and is intended to include any self-powered vehicle able to tow or pull another vehicle, referred to as the "trailer." The truck is indicated in outline at 10 and the trailer at 11. Each vehicle is provided with a plurality of ground engaging wheels 14 each of which has a brake 15 which is applied by fluid actuated unit 16, the unit 16 commonly being referred to as a brake cylinder. Operating fluid under pressure is supplied to each unit 16 by means of a branch fluid supply line or conduit 18 connected to the unit.

There are two sources of fluid under pressure. One of these is storage tank 20 carried on truck 10 and the other is storage tank 21 carried on trailer 11. Any other suitable type of source may be used. Compressor 22 on the truck compresses air for replenishment of the supply in tank 20 when some of the compressed air is used in the application of the brakes. When air is used from trailer tank 21 in the application of the trailer brakes, the air in tank 21 is replenished from forward tank 20 by flow through a main fluid supply conduit which, for purposes of description may be considered as having two sections 23 and 24 principally on the truck and trailer respectively. The conduit interconnects the two storage tanks or sources of fluid supply in a manner which will later be described in further detail.

On the truck, it is conventional practice for compressed air to flow through a portion of supply conduit 23 and a main supply branch 23a to a remotely controlled distribution valve 26 which is preferably of the quick release type. From valve 26, air goes into branch supply lines 18 connected to the valve and to individual brake cylinders 16. Valve 26 is controlled by air pressure applied thereto through control conduit 28 which is connected to foot operated valve 30. Control fluid line 28 extends forwardly at 28a to valve 27 from which cylinders on the front wheels are supplied with air reaching the valve through line 28a. As a matter of actual practice, the valve 26 may be replaced with a valve of the type at 27, which would then be supplied with air for the brake cylinders by line 28. With a valve of this latter type, supply branch 23a can be omitted.

Valve 30, and a similar hand operated valve 29, are connected by conduit 31 to tank 20. Generally, it is desired that hand valve 29 operate only the trailer brakes and that foot valve 30 operate both the truck and trailer brakes; and if this type of control system is desired, check valve 32 is inserted in the control system in the position shown.

The braking system on trailer 11 is in some respects separable from the braking system on the truck although it is dependent thereon for replenishment of the air used from tank 21 and is connected to the truck system in a manner that the trailer brakes are applied simultaneously with the truck brakes when the driver manipulates valve 30. Because of such interconnection, the whole may be viewed as a single system with two more or less distinct groups of units controlled, one being the brake cylinders on the truck and the other the cylinders on the trailer.

On the trailer, section 24 of the main supply conduit passes through valve 36 on its way from valve 42 on the truck to trailer storage tank 21. Air from the compressor on the truck flows through the main supply conduit and a section of valve 36 to supply tank 21 on the trailer. Valve 36 is remotely controlled and is similar in operation to valve 26 but performs an additional emergency function of acting as a simple check valve to prevent loss of air from the trailer storage tank if the supply line is broken ahead of valve 36, as is mentioned later. In response to air pressure applied through line 38, valve 36 controls the supply of air from tank 21 through individual branch lines 18 to each of the brake cylinders 16. At this time air flows from tank 21 to valve 36 and thence out through branches 18. Valve 36 may be any conventional type of combination valve such as shown in Figure 6 of Eaton Patent 2,024,343, issued December 17, 1935, or may be replaced by a plurality of valves as in Lewis Patent 1,438,317, issued December 12, 1922.

The elements of the compressed air braking system so far mentioned are not described in detail since they may be of any known type suitable for the purpose and the details of their construction and operation are not limitative upon the present invention.

Distribution valve 36 is operated by means of air pressure applied to it through the trailer control conduit 38 which is connected to valve 39. The truck control conduit 40 is also connected to valve 39 from which it extends forwardly to its connection with check valve 32. Air for the operation of valve 36 enters control conduit 38 from cross connection 41 connected to valve 39 and to the main fluid supply conduit at a point between valve 42 and valve 36. Valves 39 and 42 are mounted on truck 10 ahead of the hose sections in the supply and control conduits between the truck and trailer. These sections have connectors at 43 for interconnecting the truck and trailer conduits. The construction and operation of valves 39 and 42 will be more readily understood by reference to Fig. 2 in which these valves are shown in detail.

From the description so far it will be understood that the entire fluid pressure control system may be viewed functionally as including a main fluid supply system and a control fluid system. The fluid supply system includes the two storage tanks, the compressor, and the conduits supplying air from the tanks to the brake cylinders, especially conduits 23 and 24. The control fluid system includes primarily the conduits for applying actuating air pressure to valves 26 and 36, such as conduits 28, 40, 38, and 41. However, the two subordinate systems are not necessarily separate or mutually exclusive. For example, the conduit at 28a has a dual function as it partakes of the character of both the supply and control systems. Also, the make up of the two systems can be changed in various respect so that the specific arrangement in the drawings is not limitative on the invention. Although conduit 40 does not lead to a valve such as 26 to control the truck brakes, it is in communication with lines 31 and 28 and so is treated as part of the truck control conduit. This is done also because valve 39 operates normally to interrupt direct communication between conduits 38 and 40.

Valve 42 has a housing or body 44 which encloses an inner chamber 45. Body 44 is preferably made in two parts which are bolted together, in order to facilitate assembly of the parts and also to clamp diaphragm 46 around its periphery between the two parts of the housing. Diaphragm 46 is so located as to divide the inner chamber 45 into two portions 45a and 45b, the latter being fluid tight. In chamber 45a at one side of diaphragm 46 is compression spring 47 which at one end bears against plate 48 attached to diaphragm 46. The other end of spring 47 bears against abutment member 50, the position of which may be adjusted by screw 51 threaded into the valve body. By turning screw 51 in a direction to move abutment 50 inwardly, spring 47 is placed under greater compression and exerts an increased force on diaphragm 46. As screw 51 is retracted, the reverse occurs and the force exerted on diaphragm 46 is decreased.

Diaphragm 46 and plate 48 carry attached to them, in any suitable manner, movable valve member 53. This valve member travels with the diaphragm and is adapted to engage seat 54 in the valve body at one extreme of its range of movement. When in engagement with seat 54 as shown in Fig. 3, valve member 53 is in closed position; and it is biased toward this closed position by spring 47.

From the foregoing it will be apparent that diaphragm 46 is a pressure responsive member providing means for moving the valve member. Obviously a different form of member, as a piston in a cylinder, could be used in place of a diaphragm which is preferred for practical reasons.

The truck supply line 23 connects to the body of valve 42 in such a location that the supply line is in constant communication with interior chamber 45b that is separated by diaphragm 46 from spring 47. Thus the air pressure in conduit 23 at all times exists in pressure chamber 45b where it is applied to one side of diaphragm 46 in opposition to the force exerted on the diaphragm by spring 47. Consequently, the position of diaphragm 46 and also valve 53 is determined by the relative values of opposing forces exerted on the diaphragm by fluid pressure from conduit 23 and by spring 47.

The trailer supply conduit 24 also communicates with interior valve chamber 45b; but the connection of the trailer supply conduit is on the opposite side of valve seat 54 from the connection of the truck supply line. Consequently, when valve member 53 is in closed position, that is when the valve engages seat 54, fluid flow from the truck supply line to the trailer supply line is shut off. However, when valve 53 is in the open position, or withdrawn from engagement with seat 54 as in the position of Fig. 2, there is free communication between the truck and trailer supply conduit, under which condition fluid may flow from truck tank 20 to trailer tank 21 and pressure throughout the entire main supply conduit is substantially equalized.

As a matter of convenience, there is also incorporated in body 44 a second valve means which is of the check type. This valve consists of ring 55 which is adapted to seal passage 56 which extends around or by-passes valve member 53 and seat 54. Passage 56 by-passes valve 53 to place internal chamber 45b in communication with the trailer supply line under certain conditions. Spring 58 bears against pad 59 on diaphragm 46 and also against a similar pad 59a on sealing ring 55. The force exerted by spring 58 normally keeps ring 55 in the position shown in Fig. 2 in which by-pass passage 56 is closed to fluid flow. When the pressure in the trailer supply line exceeds that in the truck supply line by a sufficient amount, ring 55 is raised and fluid is able to flow from the trailer supply line through passage 56 and chamber 45b into the truck supply line 23. Fluid flow is limited to this one direction as a higher pressure in chamber 45b closes passage 56.

Valve 39 has a housing or body 60 which encloses an interior space 61. For the same reasons explained above, body 60 is preferably made in two parts which clamp between them the periphery of diaphragm 62 that extends across interior space 61 and divides it into two portions 61a and 61b. Diaphragm 62 carries at one side plate 64 against which compression spring 65 bears. The other end of spring 65 bears against housing 60. Plate 64 also serves as a means for supporting stem 66 which carries movable valve member 67 that is adapted to move into engagement with valve seat 68, suitably formed in valve body 60. This position of the valve member is shown in Fig. 3.

Here also, diaphragm 62, being a pressure responsive member for moving valve member 67, may be replaced by other suitable types of pressure responsive members, such as a piston in a cylinder.

Truck control line 40 is connected to valve 39 in such a way as to communicate with the interior chamber 61b at one side of diaphragm 62 with the result that air pressure in the truck control line is applied to diaphragm 62 and exerts thereon a force in a direction which tends to move valve member 67 out of engagement with seat 68. Trailer control line 38 is connected to the body of valve 39 at a position such that air pressure in the trailer control line is applied to chamber 61a at the opposite side of diaphragm 62, in opposition to the air pressure previously mentioned and in a direction to move valve member 67 into engagement with seat 68.

There is also a connection of valve 39 to cross connecting line 41 which connects valve 39 with the main supply line. The connection of line 41 to housing 60 is so located that valve seat 68 and valve member 67 are interposed between conduit 41 and trailer control conduit 38. With the result that when valve 67 is closed against seat 68 there is no communication between line 41 and the trailer control line. On the other hand, when valve 67 is open, as shown in Fig. 2, air under pressure can flow from the trailer supply line through valve 39 to the trailer control line.

It is convenient to incorporate in the same housing 60 a second valve means which functions as a check valve interconnecting the two control conduits under certain conditions. This valve means comprises a flexible disc 70 mounted on diaphragm 62 to overlie and close one or more openings 71 (see Fig. 4) through the diaphragm. The outer part of disc 70 is held against the diaphragm to close the openings by ring 72 which is pressed against the disc by spring 73. Spring 73 bears also against housing 60 and presses ring 72 lightly in place to prevent flow of air from chamber 61b through diaphragm 62 to the other side. However, when the air pressure in the trailer control conduit exceeds that in the truck control conduit by a set amount, disc 70 is moved away from diaphragm 62 by the excess air pressure sufficiently to permit air to flow through openings 71 into truck control line 40.

It will be seen that valve 39 is essentially a pressure balanced valve since the movable valve member 67 is moved into and out of engagement with its seat by travel of diaphragm 62 which is responsive to air pressure on both sides so that the position of the diaphragm and the valve is determined by the resultant of the forces applied to the diaphragm by fluid pressure, except for the relatively small force applied to the diaphragm by spring 65. The force of this spring is somewhat offset by the force exerted by spring 73, although spring 65 is stronger and is adapted to cause valve member 67 to seat in the closed position when the fluid pressures on the two sides of diaphragm 62 are equal or substantially so. Mounting the check valve means on the diaphragm is done merely to obtain an economical unitary construction and does not change the principle of operation of the main valve.

The operation of valves 42 and 39 during normal operating conditions of the brake system will now be described briefly. Assuming an initial condition in which there is no operating pressure in tank 20, the pressure in the main supply line is zero and both valves 53 and 67 are closed. As compressor 22 fills storage tank 20, the pressure in the truck tank builds up and the same pressure exists in the truck supply line 23, but initially this pressure is insufficient to open valve 53.

For reasons which will become more fully apparent, valve 53 is normally set to open at a pressure which is above the minimum pressure in the brake system at which tank 20 still has sufficient pressure and operating fluid to safely operate the brakes on the truck. By way of typical example, this fluid pressure may be in the neighborhood of 60 pounds per square inch. Under this condition, when the pressure in tank 20 reaches 60 pounds, valve 53 is opened and air is supplied through conduits 23 and 24 to tank 21. This condition exists as the pressure within the system is increased to the maixmum value at which compressor 22 is shut off. By way of a typical example, this maximum pressure may be assumed to be in the vicinity of 110 pounds per square inch; and it then exists in tanks 20 and 21 and throughout the main supply line consisting of the truck and trailer supply lines 23 and 24 respectivley. Valve 53 is held widely open, the excess pressure over the minimum value of sixty pounds required to open the valve merely serving to further compress spring 47.

Assume now that the brakes are applied on both vehicles by depressing food pedal at valve 30. Air under pressure then passes through valve 30 and control line 28 to valve 26 which operates in a conventional manner to supply air from line 23a to branch conduits 18 which supply operating fluid to the individual brake cylinders 16 on the rear wheels 14 of the truck. A forwardly extending control line 28a supplies air directly to the front wheel brakes from valve 27. Air under pressure also passes through check valve 32 into line 40 of the truck control system with the result that the air pressure against diaphragm 62 moves valve 67 to open position. When valve 67 is open, air enters the trailer control line 38 from the trailer supply line 24 through cross connection 41. When the pressure in the trailer control conduit becomes substantially equal to the air pressure in the truck control conduit, the fluid pressures acting upon diaphragm 62 are substantially equal and the diaphragm is then moved in response to the force exerted by spring 65 in a direction to close valve 67. In this way, the fluid pressures in the two control conduits are built up to substantially equal values and the result is much the same as if the two control lines were one continuous line, as is the conventional practice in brake systems for truck and trailer units.

The pressure in control line 38 operates valve 36 to allow air to pass through the valve from conduit 24 and/or tank 21 to brake cylinders 16 on the trailer by way of the associated branch lines 18. The air supplied to the cylinders sets the trailer brakes along with and at the same time that the truck brakes are applied.

In order to release the brakes, the foot pedal controlling valve 30 is returned to its off position which permits the escape of air from control conduits 28 and 40 to the atmosphere. This reduction in air pressure in the control lines causes valves 26 and 27 to relieve quickly the pressure in branch lines 18 and cylinders 16 to release the brakes. Valves 26 and 27 are designed to vent directly to the atmosphere in order to give a practically instantaneous release to the brakes rather than a comparatively slow release as would be necessary if the air were to drain back through the system and exhaust at a point, such as valve 30, remote from the brake cylinders. It was explained above how, when the operating pressures in conduits 38 and 40 are equalized, valve 67 is closed, cutting off the supply of pressure to the trailer control line. When the pressure in the truck control line drops, the excess pressure trapped in the trailer control line is relieved through opening 71 in valve diaphragm 62 when the pressure differential is sufficient to cause flexible disc 70 to move away from the diaphragm and permit flow of air back into the truck control line. In this way the truck and trailer control conduits are temporarily placed in direct communication with each other for the purpose of reducing pressure in the trailer conduit whenever it is higher than the pressure in the truck control conduit.

The drop in pressure in control conduit 38 causes valve 36 to open to the atmosphere in a manner to relieve pressure quickly in branch lines 18 and the connected cylinders 16. This quick release feature of valve 36 gives nearly instantaneous release of the trailer brakes, which takes place simultaneously with release of the truck brakes.

The operation of valves 42 and 39 to safeguard the systems against entire loss of operating fluid and pressure may easily be understood by considering in turn their action in the event of a mechanical failure in any one of the truck or trailer supply conduits or the truck or trailer control conduits. Let us assume first that there is a break occurring somewhere in supply conduit 24 at any point between valve 42 and valve 36, as for example, by rupture or disconnection of the hoses forming the coupling between the truck and trailer. This break in line 24 allows air at the high pressure normally maintained in the line to escape directly to the atmosphere with the result that the pressure in line 24 is suddenly reduced. The reduction of pressure causes an automatic operation of valve 36 to shut off line 24 and admit air from reservoir 21 directly to the brake cylinders 16 on the trailer wheels to apply the trailer brakes. This braking action is fully automatic and is accomplished by the emergency action taken by valve 36. An automatic valve of this type is widely used and often required by regulations in order to assure stopping the trailer in the event it breaks away from the truck. Emergency valves usually operate in response to the decrease in static pressure in line 24 or in response to the kinetic energy of air flowing through the valve in the reverse direction, as a result of a break, at a rate in excess of a predetermined rate.

It is desired to point out that valves 42 and 39 have utility even through no emergency valve 36 is on the trailer, since these valves function primarily to preserve the truck braking system as an intact, operating unit; and they do this independently of the emergency valve. However, the presence of a valve at 36 of this emergency type has distinct advantages in my braking system, as will be described.

The assumed rupture in line 24 also causes a drop in the air pressure maintained in truck supply conduit 23; but as long as there is sufficient air in the main tank 20 to maintain a pressure in conduit 23 in excess of the pressure at which valve 53 closes, this escape of air continues. However, when the pressure in conduit 23 has been lowered to the point at which valve member 53 closes, which we have previously assumed to be a pressure of about 60 pounds per square inch, then valve 53 seats and prevents the escape of further air from the brake system on the truck. This residual pressure in the tank is sufficient for the driver to apply the truck brakes in the normal manner and bring it to a stop. When the brakes are applied, air pressure is built up in truck control line 40 in the normal manner and the pressure at one side of diaphragm 62 is increased as previously described. Since there is now no pressure supplying air to the trailer control line, there is no opposing fluid pressure built up on the other side of diaphragm 62 so that the diaphragm merely moves in a direction to open valve 67 until plate 64 engages an abutment 75 on the valve housing to limit its travel. Diaphragm 62 maintains normal control pressures within conduit 40.

Assume a truck and trailer equipped with emergency relay valves of the type shown in the Lewis or Eaton patents referred to above but in which excessive use of the brakes has reduced the pressure within the entire system to a point below the pressure at which valve 53 remains open, a not infrequent occurrence with inexperienced drivers, and assume also that a rupture occurs in truck supply line 23 at some point between tank 20 and valve 42. A rupture in the supply line at this point drains storage tank 20 and deprives the driver of the ability to control the brakes at all since air pressure does not exist for transfer to control lines 28, 38 and 40 for the purpose of actuating the brakes. Under these conditions, valve 53 has closed; but because the pressure in conduit 24 exceeds that in conduit 23, by-pass valve 55 opens and air escapes rapidly from supply conduit 24 through by-pass 56 and chamber 45b into supply line 23 and thence to the surrounding atmosphere. In this way the pressure in the trailer supply line is reduced to the point that valve 36 automatically acts to set the trailer brakes. This braking action is effective enough to stop both the trailer and truck, although not as rapidly as if the brakes on both vehicles were operating.

A third, and probably most dangerous type of failure, is a failure in the control line for the trailer at some point between valve 39 and valve 36. In addition to the factors which may cause a failure in any conduit, a frequent source of trouble in the trailer control line is a parting of the couplings at 43. Since these couplings are not under continuous high pressure, which normally tends to keep them in proper engagement, they may vibrate loose from the constant jarring as the truck travels along the highway, especially if the couplings are not properly or fully engaged at the time the truck and trailer are connected. In the conventional type of brake system, this failure is one most to be feared since it renders the entire control conduit incapable of functioning without creating a compensating condition under which trailer valve 36 automatically sets the trailer brakes. However, in my improved braking system the control line to valve 36 is divided into two segments 38 and 40 separated by valve 39; and even though conduit 38 is incapable for any reason of holding operating fluid, control conduit 40 continues to function in the normal manner with the result that the air pressure is maintained in control conduit 28 and the truck brakes can be operated normally.

When the truck brakes are applied by foot pedal 30 or hand valve 29 is opened under this condition, diaphragm 62 is moved in a direction to open valve member 67; but opposing fluid pressure is not built up in the valve on the opposite side of diaphragm 62 since the air entering through cross connection 41 escapes through the rupture in the conduit 38. As a consequence, even though the control line 38 is not capable of operating valve 36 in the usual manner, the trailer brakes will be automatically set by valve 36 being actuated by the drop in pressure caused in line 24 as the air escapes through line 41 and valve 39 from the fluid supply system. Air continues to escape from the truck main supply line past valve 67 and out the break in the trailer line until pressure in the truck supply line is reduced to the point at which spring 47 operates to close valve member 53. At this point there is still sufficient operating pressure to apply the brakes on the truck. At this reduced pressure the compressor would start and deliver air to the brake system. As long as valve 67 is held open, the air thus delivered would open valve 53 and flow through valves 42 and 39 to the atmosphere at the break in line 38; but closing valve 39 by releasing the truck brakes or closing hand valve 29 causes an almost immediate flow of air through supply line 23—24, building up pressure in the supply system in excess of the pressure at which 53 closes. Air flows through pipe 24 to valve 36 and overcomes the emergency action of valve 36, releasing the trailer brakes. This is an important and unique feature of this brake system, for this action of setting or releasing the trailer brakes is very rapid in either instance. Thus there is no danger of the truck and trailer being stalled with the brakes set so that the truck or trailer cannot be moved, should the driver need to apply the brakes when the control conduit 38 between the truck and trailer is broken.

The fourth possibility is a failure in conduit 40 on the truck the result of which is to allow air to escape from the system when either valve 29 or 30 is open to apply the brakes. Since operating pressure cannot be built up in conduit 40 because of this failure in the line, valve 39 remains closed and neither the truck brakes nor the trailer brakes are directly applied; but as long as either valve 29 or 30 remains open, air flows out of storage tank 20 and escapes to the atmosphere. The result is an operation by valves 39 and 42 of the same character as described above under the assumed condition of a failure in conduit 23. The end result is application of the trailer brake as a result of automatic emergency action by valve 36.

There is another or fifth possibility and that is a breakaway of the trailer from the truck, tearing out both lines 38 and 24 rearward of valves 39 and 42 respectively. It will be evident from the previous discussion that valves 39 and 42 operate in this case to preserve the operating integrity of the truck system. The pressure in the fluid supply system drops until valve 53 closes, holding a lowered pressure in the system sufficient to operate the truck brakes normally. Diaphragm 62 in valve 39 seals the end of conduit 40 so that the control system on the truck holds pressure and functions normally. Hence the driver still has full control over the truck brakes.

Fig. 3 is a cross sectional view similar to Fig. 2 but illustrating a variational form of valve construction which functions in the manner described above. Valve 77 has the same construction and operation as valve 42 except that passage 56 and valve ring 55 together with spring 58, have been omitted from the valve first described to arrive at the construction of valve 77 illustrated in Fig. 3. As a substitute for these omitted parts check valve 78, which may be of any conventional construction, is placed in by-pass line 79 which connects to the truck and trailer supply lines 24 and 23 respectively.

In Fig. 3, movable valve member 53 is shown in engagement with valve seat 54, thus closing the main supply line to fluid flow between the truck and trailer. This is the position valve member 53 occupies when the air pressure in conduit 23 is below the pre-established pressure at which valve 53 is opened. Under this condition, air can flow through check valve 78 in the direction of the arrow from trailer supply conduit 24 to truck supply conduit 23 when the air pressure in the trailer line is higher than in the truck line. Hence, unidirectional fluid flow into conduit 23 is possible when valve member 53 is closed and the pressure in conduit 24 is high enough to open check valve 78 to by-pass valve 77.

Likewise, valve 81 has the same construction and operation as valve 39 except that all openings 71 have been omitted from diaphragm 62 in the construction of Fig. 3. Omission of openings 71 makes possible the elimination of valve disc 70, ring 72 and spring 73. In place of these omitted features, there is used check valve 82, which may be of any conventional construction, placed in by-pass line 83 which is connected between trailer control conduit 38 and the truck control conduit 40.

Because diaphragm opening 71 no longer exists, fluid flow into the truck control line is no longer possible through valve 81. It is possible, however, through check valve 82 when the pressure in the trailer control conduit exceeds the pressure in the truck control conduit. Thus the two control conduits are interconnected by a by-pass line 83 through which unidirectional fluid flow is permitted by check valve 82 so that the two control conduits are temporarily interconnected to relieve air pressure in the trailer control line in order to release the brakes in the same manner as the form illustrated in Fig. 2.

Having described a preferred embodiment of my invention, together with certain modifications thereof, it will be understood that other changes in the construction and arrangement of parts may be made by persons skilled in the art without departing from the spirit and scope of my invention. Consequently, I wish it understood that the foregoing description is considered as being illustrative of, rather than limitative upon, the appended claims.

I claim:

1. In a compressed air system for operating the brakes on a truck and attached trailer towed by the truck, the combination comprising: separate sources of air under pressure on the truck and on the trailer; a main supply conduit extending between the truck source of air and the trailer source of air for transfer of air under pressure to the trailer source; a control fluid system receiving air from said sources for controlling operation of the truck and trailer brakes; and valve means mounted on the truck in the main supply conduit including a movable valve member biased toward a closed position to stop fluid flow to the trailer, and pressure responsive means always exposed to fluid pressure existing in the section of the supply conduit between said truck source and said valve member even when said valve member is closed and operable by said last mentioned fluid pressure to move the valve member automatically to an open position in response to the existence of a predetermined fluid pressure in the supply conduit between said truck source and said valve member.

2. In a compressed air system for operating the brakes on a truck and attached trailer towed by the truck, the combination comprising: separate sources of air under pressure on the truck and on the trailer; a main supply conduit extending between the truck source of air and the trailer source of air for transfer of air under pressure to the trailer source; a control fluid system for controlling operation of the truck and trailer brakes, said system including a first control fluid conduit receiving air under pressure from the truck source of air and a second control fluid conduit for the trailer controlling operation of the trailer brakes; valve means connected to the supply conduit and to both control conduits, adapted to supply air under pressure to the second control conduit from the main supply conduit in response to air pressure applied to the valve means from the first control conduit; valve means in the main supply conduit including a movable valve member biased toward a closed position to stop fluid flow to the trailer, and means moving the valve member to an open position in response to a predetermined operating air pressure applied through the supply conduit; a check valve interconnecting the two control conduits to permit unidirectional fluid flow between the two control conduits when the first mentioned valve means is in closed position; and a second check valve connected to the supply conduit to by-pass the movable valve member of the second mentioned valve means to permit unidirectional flow when the movable valve member of the second mentioned valve means is in closed position.

3. In a compressed air system for operating the brakes on a truck and attached trailer towed by the truck, the combination comprising: a storage tank on the truck and a storage tank on the trailer each providing a source of air under relatively high operating pressure; a main supply conduit extending between the truck and trailer tanks and normally carrying the same operating pressure as the tanks; a control fluid system for controlling operation of the truck and trailer brakes, the system including a control fluid conduit for the truck receiving air pressure from the truck storage tank and a separate control fluid conduit for the trailer for controlling operation of the trailer brakes; valve means on the trailer connected to the supply conduit and adapted automatically to supply operating fluid to the trailer brakes when operating pressure in the supply line drops below a predetermined value; safety valve means on the truck and in the supply conduit including a movable valve member biased toward a closed position shutting off fluid flow to the trailer but movable to an open position in response to a predetermined air pressure applied from the truck tank; a second safety valve means mounted on the truck and connected to both control conduits and to the supply conduit, adapted to supply air under pressure to the trailer control conduit from the main supply conduit in response to air pressure applied to the valve means from the truck control conduit; a check valve connected to the supply conduit to permit unidirectional flow of air around the movable valve member of the first mentioned safety valve means when the movable valve member of the first mentioned safety valve means is in closed position and the air pressure in the portion of the main supply conduit on the trailer is higher than in the portion on the truck; and a second check valve interconnecting the two control conduits to permit fluid flow from the control fluid conduit for the trailer into the control fluid conduit for the truck when air pressure in the control fluid conduit for the trailer is higher than in the other control fluid conduit.

4. In an air brake system for a truck and attached trailer, having a main supply conduit interconnecting air storage tanks on the truck and trailer and carrying a relatively high operating pressure, the combination comprising: safety valve means mounted on the truck and dividing the supply conduit into two sections of which one extends between the valve means and the storage tank on the truck, said valve means including a movable valve member biased toward a closed position in which the valve stops air flow from said section of the supply conduit, means moving the valve member to an open position by air pressure from said one section of the supply conduit in excess of a predetermined value, and a check valve permitting fluid to flow around said movable valve member when pressure in the said one section of the supply line is lower than in the remainder of the supply conduit.

5. In an air brake system for a truck and attached trailer, having a main supply conduit connected to a source of air under pressure and carrying a relatively high operating air pressure and a control fluid system that includes a control fluid conduit on each of the truck and the trailer, the combination comprising: a safety valve means mounted on the truck and connected to the supply conduit and to both control conduits and having a movable valve member biased toward a normally closed position, means for moving the valve member to an open position in response to air pressure from the control conduit on the truck to permit air to flow from the supply conduit to the other control conduit, and a check valve permitting fluid flow from the control conduit on the trailer into the control conduit on the truck when pressure in the trailer control conduit is higher than in the truck control conduit.

6. In a compressed air system for operating the brakes on a truck and attached trailer towed by the truck, the combination comprising: separate sources of air under pressure and on the truck and on the trailer; a main supply conduit extending between the truck source of air and the trailer source of air for transfer of air under pressure to the trailer source; a control fluid system for controlling operation of the truck and trailer brakes, said system including a first control fluid conduit receiving air under pressure from the truck source of air and a second control fluid conduit for the trailer controlling operation of the trailer brakes; valve means mounted on the truck and in the main supply conduit, said valve means including a movable valve member biased toward a closed position to stop fluid flow to the trailer, and pressure responsive means always exposed to fluid pressure existing in the section of the supply conduit between said truck source and said valve member even when said valve member is closed and operable by said last mentioned fluid pressure to move the valve member automatically to an open position in response to the existence of a predetermined fluid pressure in the supply conduit between said truck source and said valve member; and a second valve means connected to both control conduits and to the supply conduit at a point between the trailer and the first mentioned valve means in the supply conduit, said second valve means including a movable valve member biased to a position shutting off communication between the main supply system and said second control fluid conduit and pressure responsive means exposed to fluid pressure in said first control fluid conduit and moving the last mentioned movable valve member to an open position in response to an increase in fluid pressure in said first control fluid conduit, said last mentioned valve member when open allowing air under pressure to flow from the main supply conduit into said second control fluid conduit.

7. In a compressed air system for operating the brakes on a truck and attached trailer towed by the truck, the combination comprising: a storage tank on the truck and a storage tank on the trailer each providing a source of air under relatively high operating pressure; a main supply conduit extending between the truck and trailer tanks normally carrying the same operating pressure as the tanks; a control fluid system for controlling operation of the truck and trailer brakes, the system including a control fluid conduit for the truck receiving air pressure from the truck storage tank and a separate control fluid conduit for the trailer for controlling operation of the trailer brakes; valve means on the trailer connected to the supply conduit and adapted automatically to supply operating fluid to the trailer brakes when operating pressure in the supply line drops lower than a predetermined value; safety valve means on the truck and in the supply conduit including a movable valve member biased toward a closed position shutting off fluid flow to the trailer and pressure responsive means exposed to air pressure existing in the main supply conduit between the truck storage tank and said valve member when said valve is closed and operable in response to said last mentioned air pressure when in excess of the predetermined value to open said valve member automatically; and a second safety valve means mounted on the truck and connected to both control conduits and to the supply conduit at a point between the trailer and the first mentioned valve means in the supply conduit, adapted to supply air under pressure to the trailer control conduit from the main supply conduit past the first mentioned valve in said supply conduit in response to air pressure applied to the second valve means from the truck control conduit.

References Cited in the file of this patent

UNITED STATES PATENTS

| | | |
|---|---|---|
| 1,438,317 | Lewis | Dec. 12, 1922 |
| 1,703,896 | Parke | Mar. 5, 1929 |
| 1,797,431 | Mathieson | Mar. 24, 1931 |
| 2,024,343 | Eaton | Dec. 17, 1935 |
| 2,074,292 | Wilkins | Mar. 16, 1937 |
| 2,084,707 | Robinson | June 22, 937 |
| 2,261,365 | Grove | Nov. 4, 1941 |
| 2,451,139 | Williams et al. | Oct. 12, 1948 |